No. 612,513. Patented Oct. 18, 1898.
H. A. BOWERS.
FRYING PAN LID.
(Application filed July 17, 1897.)
(No Model.)

Witnesses

Inventor
Hiester A. Bowers.
By his Attorneys,

UNITED STATES PATENT OFFICE.

HIESTER A. BOWERS, OF READING, PENNSYLVANIA.

FRYING-PAN LID.

SPECIFICATION forming part of Letters Patent No. 612,513, dated October 18, 1898.

Application filed July 17, 1897. Serial No. 644,957. (No model.)

*To all whom it may concern:*

Be it known that I, HIESTER A. BOWERS, of Reading, in the county of Berks and State of Pennsylvania, have invented certain new and useful Improvements in Frying-Pan Lids; and I do hereby declare the following to be a full, clear, and exact description of the invention, such as will enable others skilled in the art to which it appertains to make and use the same.

This invention relates to improvements in covers for frying-pans and other cooking vessels; and the object that I have in view is to provide an improved construction by which accumulations of moisture or the sweating of the interior surface of the cover is almost, if not wholly, obviated, thus preventing the return of the condensation of moisture and grease back into the pan, which, as is well known, retards the process of frying and serves to toughen the meat, making it impossible to retain the delicious flavor imparted to the meat by what is known as the "free-frying process," or frying in a practically uncovered pan.

A further object of the invention is to provide a cover in which provision is made for the unobstructed and free escape of vapors from the pan practically throughout its entire area and to reduce to a minimum the tendency of the grease to spatter out of the pan and cover and lodge upon the stove, thus making the latter present a clean appearance and overcome the objection of burning grease filling the room with smoke and vapor.

With these ends in view the invention consists of a substantially dome-shaped cover having an inwardly-extended supporting-flange at its lower edge adapted to rest upon the edge of a frying-pan or other cooking vessel and to support the cover thereon, the lower part of said cover rising from the flange, at the outside edge thereof, and presenting an imperforate surface in a vertical plane outside of the line of the ascending smoke and vapor arising from the pan, so that condensations of moisture and grease will not accumulate on the imperforate surface of the cover adjacent to the inwardly-extended flange thereof.

To enable others to understand the invention, I have illustrated different embodiments thereof in the accompanying drawings, forming a part of this specification, and in which—

Figure 1:
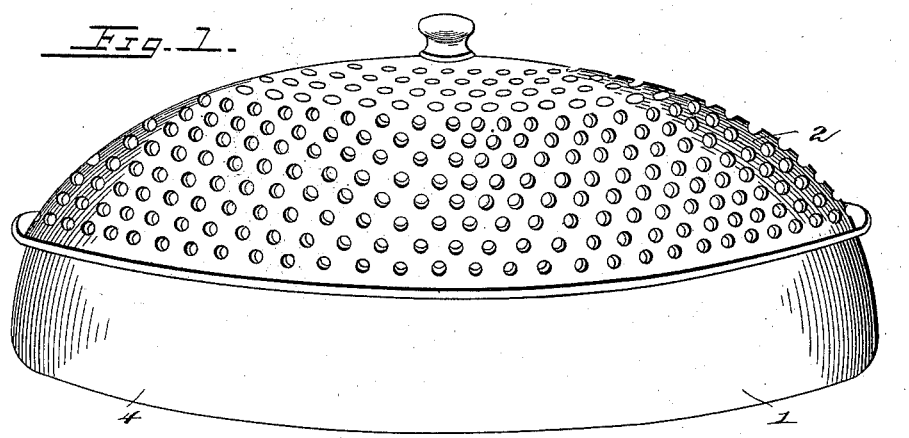
Figure 2:
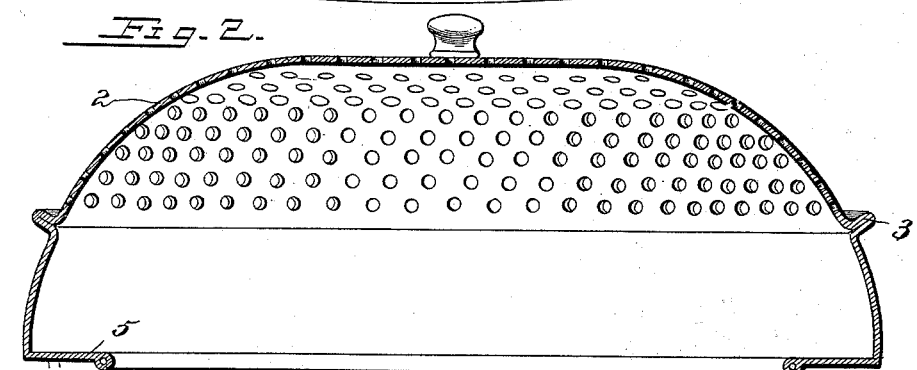
Figure 3:
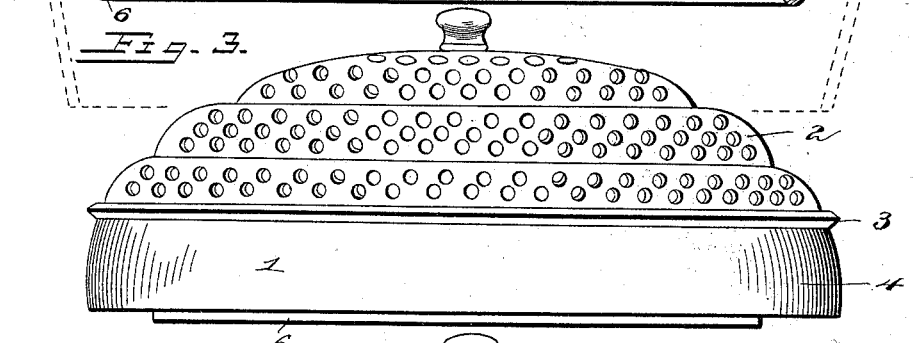
Figure 4:
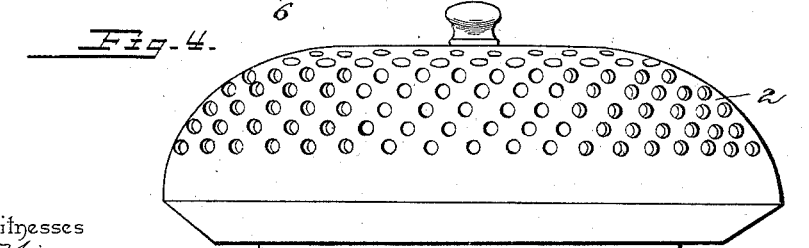

Figure 1 is a perspective view of the preferred embodiment of the invention. Fig 2 is a vertical sectional elevation of the cover represented by Fig. 1. Fig. 3 is a modified construction of the cover, and Fig. 4 is an elevation of another embodiment of the device.

Like numerals of reference denote like and corresponding parts in each of the several figures of the drawings.

Referring more particularly to Figs. 1 and 2, the cover consists of a substantially dome-shaped structure made of a single piece of sheet metal stamped or struck up in the desired form. At a line about midway of its height the metal is doubled or folded upon itself, as at 3, to produce an offstanding annular flange or ledge, and above this ledge the cover is perforated with a plurality of transverse openings throughout the entire area thereof above the flange 3. The annular part of the cover below the offstanding flange 3 is imperforate, as at 4.

One of the important features of my improvement consists in the provision of the inwardly-extending flange 5, which is joined at its outer edge to the lower edge of the imperforate part 4 of the cover, and the inner edge of this inwardly-extending flange is provided with a bead 6. The flange and its bead form an integral part of the cover, as the latter is struck up from a single piece of metal, and the flange 5 is bent inwardly from the lower edge thereof. In the preferred form of the cover the flange is arranged in a horizontal position to serve as a support for the cover upon the frying-pan or other cooking utensil, and the inner bead-formed edge 6 of this flange terminates in a vertical plane within the lower line of perforations 2 in the dome-shaped upper part of the cover. This horizontal inwardly-extending flange 5 is adapted to rest upon the upper edge of the pan or other vessel, and as the flange is quite wide the cover is adapted for use on cooking vessels of different sizes. I attach special importance to the arrangement of the flange, which extends inwardly from the lower edge of the imperforate part of the cover, because the flange restricts the area of the opening in the cover through which the vapors and smoke may ascend from the contents of the pan or vessel upon which the cover is placed, whereby the ascending currents of vapor and smoke are prevented from impinging against the imperforate lower part 4 of the cover, and thus moisture and grease are prevented from condensing on said imperforate part of the cover. The upper arched or crowned part of the dome-shaped cover is perforated with a multiplicity of openings arranged to permit free and unobstructed exit of the ascending vapors and smoke from the frying-pan, and any moisture or grease which may be carried through the cover and become deposited upon the outer surface thereof will trickle over the cover and accumulate in the narrow trough or channel provided by the inclined offstanding flange on the outer side of the improved cover.

The cover represented by Fig. 3 has the arched or curved upper part thereof provided with a series of concentric corrugations, each of which is perforated throughout its area. The described construction of the cover increases the surface or area thereof and provides for the formation of an increased number of openings in the cover to facilitate the egress of the smoke and vapors from the pan, but otherwise the cover contains the generic features of my invention.

As represented by Fig. 4, the shape of the cover may be slightly modified or changed while retaining the essential features hereinbefore described. In this embodiment of the invention the arched or crowned upper part of the cover has the multiplicity of perforations above the imperforate lower section, and from the lower edge of the imperforate section extends the inwardly and downwardly inclined flange, which joins with the horizontal supporting-flange 5.

The construction represented by Fig. 4 retains the generic features of the cover with the imperforate lower section between the extending horizontal flange and the arched or crowned perforated upper part of the structure; but between the horizontal supporting-flange and the lower edge of the imperforate cover-section is arranged an inclined part of the flange which joins the horizontal flange with the cover proper.

A cover constructed in accordance with my invention is adapted to be used on cooking vessels or frying-pans of different sizes, because the horizontal supporting-flange provides a comparatively wide surface by which the structure may be placed on the upper edges of different-sized pans or vessels, and as the cover is arched or crowned it is provided with a large number of perforations, and the ascending currents of vapor and smoke are free to find ready exit from the structure. By having the horizontally-supporting flange joined with the imperforate section of the cover and arranging said flange to extend inwardly beyond the imperforate section of the cover, with its lower edge terminating in a plane within the vertical plane of the lowermost series of openings, the ascending currents of vapor and smoke are prevented from impinging against the imperforate section of the cover. This construction and arrangement wholly obviates the condensation of moisture upon the imperforate cover-section.

Having thus described the invention, what I claim is—

1. As a new article of manufacture, a frying-pan cover made of a single piece and leaving an external offstanding flange, 3, on a horizontal plane between the perforated and imperforate portions of said cover and also provided with a horizontal flange, 5, that extends inwardly at the bottom of said cover and has its inner edge terminating within the vertical plane of the imperforate section of said cover, substantially as described.

2. As a new article of manufacture, a cover for frying-pans and other cooking utensils consisting of an imperforate lower section, a perforated upper section and a horizontal supporting-flange joined to the lower edge of the imperforate section and extending inwardly therefrom to have its inner edge terminate on a plane within the vertical plane of the lower series of openings in the arched or crowned section of the cover, substantially as described.

3. As an article of manufacture, a cover for frying-pans and other cooking utensils consisting of an imperforate lower section, an arched or crowned upper section provided with the plurality of perforations, an offstanding annular flange protruding from the other surface of the cover on a line between the perforated and imperforate sections thereof, and a horizontal supporting-flange extending inwardly from the lower edge of the imperforate section of the cover, substantially as described.

In testimony whereof I have signed this specification in the presence of two subscribing witnesses.

HIESTER A. BOWERS.

Witnesses:
 LOUIS G. JULIHU,
 WM. L. FORD.